United States Patent
Yagodkin et al.

(10) Patent No.: US 8,654,800 B2
(45) Date of Patent: Feb. 18, 2014

(54) METHOD AND APPARATUS FOR CONTROLLING MODE COUPLING IN HIGH POWER LASER SYSTEM

(75) Inventors: Roman Yagodkin, Worcester, MA (US); Nikolai Platanov, Worcester, MA (US); Mikhail Meleshkevich, Westborough, MA (US)

(73) Assignee: IPG Photonics Corporation, Oxford, MA (US)

( * ) Notice: Subject to any disclaimer, the term of this patent is extended or adjusted under 35 U.S.C. 154(b) by 276 days.

(21) Appl. No.: 13/099,499

(22) Filed: May 3, 2011

(65) Prior Publication Data
US 2012/0281719 A1 Nov. 8, 2012

(51) Int. Cl.
*H01S 3/07* (2006.01)

(52) U.S. Cl.
USPC .............. 372/6; 385/1; 385/2; 385/3; 385/96; 359/341.1

(58) Field of Classification Search
USPC .................. 372/6; 385/1, 2, 3, 96; 359/341.1
See application file for complete search history.

(56) References Cited

U.S. PATENT DOCUMENTS

| | | | | |
|---|---|---|---|---|
| 4,832,437 A * | 5/1989 | Kim et al. | | 385/1 |
| 4,895,421 A * | 1/1990 | Kim et al. | | 385/28 |
| 5,422,897 A * | 6/1995 | Wyatt et al. | | 372/6 |
| 5,528,707 A * | 6/1996 | Sullivan et al. | | 385/2 |
| 7,233,721 B2 * | 6/2007 | Gaeta et al. | | 385/28 |
| 7,894,692 B2 * | 2/2011 | Yagodkin | | 385/28 |
| 7,957,691 B1 * | 6/2011 | Lee | | 455/3.01 |
| 2008/0019642 A1 * | 1/2008 | Kewitsch | | 385/72 |
| 2010/0104243 A1 * | 4/2010 | Kewitsch | | 385/60 |
| 2010/0166026 A1 * | 7/2010 | Klebanov | | 372/6 |
| 2010/0296765 A1 * | 11/2010 | Yagodkin | | 385/1 |
| 2010/0296774 A1 * | 11/2010 | Yagodkin | | 385/28 |
| 2011/0064095 A1 * | 3/2011 | Gapontsev et al. | | 372/6 |

OTHER PUBLICATIONS

Benjamin G. Ward, "Modeling of transient modal instability in fiber amplifiers", May 10, 2013, Optics Express, 21, 12053-12067.
Arlee V. Smith et al. "Increasing mode instability thresho;ds of fiber amplifiers by gain saturation", Jun. 18, 2013, Optics Express, 21, 15168-15182.

* cited by examiner

*Primary Examiner* — Jessica Stultz
*Assistant Examiner* — Joshua King
(74) *Attorney, Agent, or Firm* — Yuri Kateshov; Timothy J King

(57) ABSTRACT

A high power fiber laser is configured with a multimode active fiber and input and output single mode passive fibers butt-spliced to respective opposite ends of the active fiber. If the input passive and active fibers do not have substantially matched diameters, a SM radiation coupled into the active fiber may excite fundamental and high order modes which, while interfering with one another, create a non-uniform distribution of refractive index in each of forward and backward light propagation directions along the resonator of the laser. The variable longitudinal perturbation components of the refractive index in respective forward and backward directions along an optical path in the active fiber are distributed in accordance with respective cosine functions. The length of the optical path is set so that the cosine functions of the respective perturbation components are shifted in a counter-phase position in which a cross-coupling coefficient between fundamental and high-order modes is substantially minimized. The optimal length of the optical path is maintained by controlling by either an ambient temperature or an electric field of piezo-element coupled to the MM active fiber. As a consequence, the disclosed high power fiber laser emits radiation in a fundamental mode having minimum power losses.

16 Claims, 1 Drawing Sheet

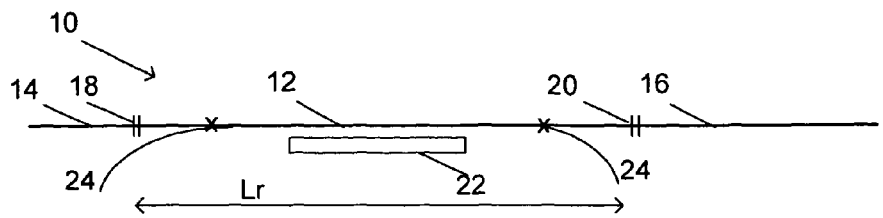
FIG. 1
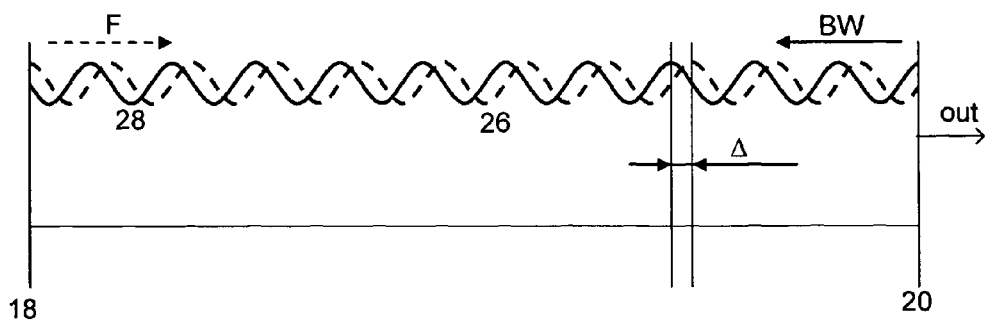
FIG. 2
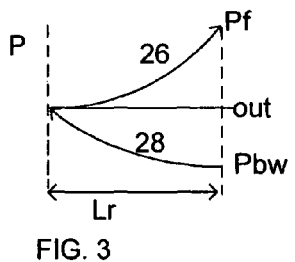
FIG. 3
FIG. 4
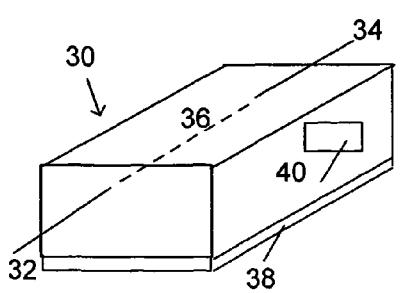
FIG. 5
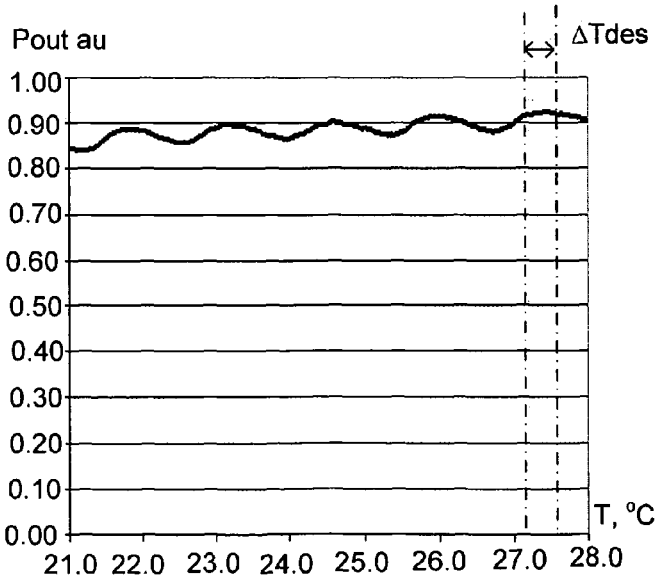

METHOD AND APPARATUS FOR CONTROLLING MODE COUPLING IN HIGH POWER LASER SYSTEM

BACKGROUND OF THE DISCLOSURE

1. Description of Related Prior Art

The disclosure relates to high-power laser and amplifier $\phi$TB systems configured to emit radiation in a fundamental mode. In particular the disclosure relates to a method and apparatus for suppressing high order modes in multimode fiber-based high power fiber laser systems.

2. Background of the Disclosure

The modern industrial trends demand scaling the power levels of fiber lasers operative to output radiation in a fundamental mode. The scaling of the power in the fundamental mode is, however, limited by two major phenomena: nonlinear effects and mode coupling with high order modes ("HOM").

Propagating intense light through long fibers leads to nonlinear distortions such as stimulated Raman scattering, stimulated Brillouin scattering, self-phase modulation, and related parametric processes. Mitigating these effects requires fibers in which the optical mode occupies a large modal area, and hence is less intense. One of the development efforts in the field of high-power fiber lasers has focused on large-mode-area (LMA) fibers characterized by a relatively high threshold for nonlinear effects.

As to the mode coupling, in ideal multimode ("MM") fiber, modes remain independent of each other as they propagate. Because each mode travels with a different group velocity, when even a few high order modes ("HOM") excited at the fiber input, the output signal can be degraded due to intermodal dispersion. In a real-world fiber imperfections such as microbends and geometric irregularities lead to an exchange of power between fundamental and HO modes. The mode coupling results in a deterioration of system performance and reduced output power coupled in the fundamental mode. A number of concerned efforts have been directed to minimize mode coupling. Yet this problem persists and needs to be addressed again and again.

It is therefore desirable to provide a new method for minimizing a coupling mode coefficient in high power fiber laser systems.

A further need exists for an apparatus configured to carry out the disclosed method.

SUMMARY OF THE DISCLOSURE

These needs are satisfied by the method and apparatus of the present disclosure. While the disclosed method and apparatus are applicable to various laser configurations, the following discussion relates to fiber laser systems and more precisely to fiber lasers systems based on multimode fibers.

A high power fiber laser operative to radiate a diffraction limited beam includes at least one active multimode ("MM") fiber, doped with known rare earth ions, and multiple single mode ("SM") passive fibers which are configured with respective mode field diameters ("MFD") each substantially matching the MFD of the fundamental mode. The SM passive fibers are coupled to respective opposite ends of the doped fiber so that not only MFDs of respective spliced fibers are substantially the same, but the fibers along respective splice regions are coaxial. These condition cause substantially lossless propagation of light through the entire waveguide. The passive fibers, as a rule, are provided with respective wavelength selective elements which define a resonant cavity that may include one or more active fibers and two or more passive fibers. Usually MFDs of respective spliced SM and MM fibers cannot be ideally matched due fiber imperfections. As a result of substantial, not ideal, matching, a SM light coupled into the MM fiber may excite high order modes. Propagating along the doped MM core fundamental and high order modes have respective wave vectors which slightly differ from one another. This leads to a non-uniform distribution of the entire electrical field of the propagating light signal which, in turn, due to the pumping of the active fiber, causes a non-uniform inversion resulting in a non-uniform distribution of refractive index. The refractive index has a variable longitudinal component further referred to as a variable perturbation component. The latter is responsible for a formation of induced mode coupling coefficient also referred to as an induced grating. Thus, the lower the variable longitudinal perturbation component, the lower the mode coupling coefficient.

The signal modes travel in opposite forward- and backward-propagating directions along a resonant cavity defined between the wave-selective elements. The perturbation component of the refractive index in the forward propagating direction and perturbation component in the backward direction can be described by respective cosine functions. Typically, the phases of the respective forward and backward perturbation components are shifted relative to one another and thus can be anywhere between in-phase and counter-phase positions.

When in counter-phase position, i.e., when the phases of respective forward and backward perturbation components differ from one another at $2\pi N+\pi$, the induced resultant grating (i.e., a resultant grating of forward-direction and backward-direction induced gratings) is weak. In other words, a mode coupling coefficient is low. Conversely, when the perturbation components are in the phase $2\pi N$ position, a mode coupling coefficient is high.

Thus depending on the phase difference between forward and backward perturbation components a mode coupling components may be either weakened or strengthened. In summary, when the cosine functions of respective longitudinal perturbation components are in counter-phase, the redistribution of mode energy, i.e., the mode coupling coefficient is decreased, and the fundamental mode preserves substantially all its energy.

The phase difference between forward and backward perturbation components is determined by the light's optical path. The optical path is the length of the path multiplied by the index of refraction of the medium and, thus, may be affected by refraction index variations. But it is a temperature of space in which the active fiber is placed, i.e. ambient temperature that affects the length of the optical path even stronger than the refractive index variations. For that the ambient temperature is of a particular interest for this disclosure. Alternatively, a piezo element can be used to alter the optical path by varying the length of the active fiber.

Thus, in accordance with the disclosure, a temperature control provides an optical path variation and therefore the desired phase shift between the resultant forward and backward propagating perturbation components. In particular, the temperature is so controlled that the perturbation components destructively interfere with one another by being maintained substantially in counter-phase.

BRIEF DESCRIPTION OF THE DRAWINGS

The above and other features and advantages will become more readily apparent from the specific description of the disclosure accompanied by the following drawings, in which:

FIG. 1 is a diagrammatic illustration of the disclosed fiber laser waveguide;

FIG. 2 is diagrammatic illustration of forward and backward perturbation components, respectively, in the active fibers of the waveguide of FIG. 1;

FIG. 3 is a diagrammatic illustration of signal power distribution in opposite directions along the resonator of the MM active fiber of the laser cavity of FIG. 1;

FIG. 4 illustrates the relationship between the laser system's output with narrow linewidth and temperature in a laser system configured according to FIG. 1.

FIG. 5 is a diagrammatic illustration of an exemplary apparatus operative to carry out the disclosed method.

SPECIFIC DESCRIPTION

Reference will now be made in detail to the disclosed system. The drawings are in simplified form and are far from precise scale. The word "couple" and similar terms do not necessarily denote direct and immediate connections, but also include connections through intermediate elements or devices. The word perturbation component means a variable longitudinal component of refractive index.

FIG. 1 illustrates a high power fiber laser system 10 representing a Fabri-Perot high power laser or oscillator as a single light amplifying cascade. Given only as a non-limited example, system 10 is configured with an active fiber 12 and upstream and downstream passive fibers 14 and 16, respectively, which are spliced to respective opposed ends of fiber 12. The passive fibers are configured as respective single mode ("SM") fibers. The oscillator further has strong and weak wavelength selective elements 18 and 20, respectively configured as fiber Bragg gratings which are written in respective passive fibers 14, 16 so as to define therebetween a resonant cavity or resonator. The resonator thus includes at least portions of respective passive fibers 14 and 16 and the entire length of active fiber 12. The active fiber 12 has a core supporting multiple modes and doped with one or more rare-earth ions which include, but not limited to Er, Yb, Tm, Nd and others.

The passive-active-passive-fiber (14, 12, 16) configuration is not exclusive. The resonant cavity may include infinite combinations of passive and active fibers between spaced wavelength-selective elements which can be advantageously used for the power scaling purpose.

The high power oscillator further has pumps 24 each typically including multiple laser diodes and other fiber lasers usually combined together so as to deliver pump light to active fiber 12. The large MM core of active fiber 12 is capable of receiving high pump powers and generates output radiation reaching kW levels.

Turning to FIG. 2, respective SM and MM fibers 14, 16 usually have respective substantially, but not ideally matched MFDs, As a result, SM light propagating through an upstream light barrier, be it the end of the active fiber or an FBG typically written in the passive fiber, when coupled into MM fiber 12 may excite HOMs. If the mode excitation is determined, all modes propagate along the resonator forth and back in opposite forward and backward directions. Although, typically, more than one HOM propagates, a particular interest has only one HOM, for example $LP_{11}$. For simplicity we can consider signal light propagating in each direction to be contributing independently to the resulting inversion distribution. As the fundamental and HOM propagate towards the other wavelength selective element, they interfere with or beat against one another creating a non-uniform distribution of electric field of the signal light leading to non-uniform distribution of inversion population. The latter leads to a non-uniform distribution of refractive index/induced grating. The signal forward and backward perturbation components 26, 28, respectively (FIG. 3), each of which is the result of the interference between the same fundamental and HO modes, may be adequately described by respective cosine functions. To minimize a coupling coefficient between fundamental and HOM, the cosine functions should be in counter-phase.

Concretely, the signal forward perturbation component 26 may be described by $$a\,\mathrm{Cos}(\Delta\beta z), \tag{a}$$

where a is a coefficient, $\Delta\beta$ is a difference between fundamental and HOM wave vectors and z-length of active fiber, then the distribution of the refractive index in the opposite backward direction is as follows:

$$b\,\mathrm{Cos}(-\Delta\beta z+\phi), \tag{b}$$

where b is a coefficient, $\phi$ is a phase shift between the resultant modes.

Based on the above, a coupling coefficient can be determined as follows:

$$k \sim \sqrt{a^2+b^2+2ab\mathrm{Cos}(\phi)} \tag{c}$$

Accordingly, if the modulation of refractive indices in respective opposite directions along the resonator is uniform, then by controllably altering the optical path, it is possible to attain such a phase shift $\phi$ between the perturbation forward and backward components that the coupling coefficient will be substantially minimized to inconsequential values. The coefficients "a" and "b" are proportional to the geometrical average of powers of respective fundamental and HOM in one direction. Hence, the minimization of the mode-coupling coefficient requires close to one another power values of respective forward- and backward-light signals. Such a condition is easily realized in a Fabri-Perot oscillator.

Returning to FIG. 1, the optical path along active fiber 12 providing for the desired operation of system 10 is realized by controlling a temperature generated by a thermo-electric component ("TEC") 22. Indeed, the length of optical path of light in the resonator is a function of temperature. Accordingly, controllable temperature change of the active core and cladding causes the shift between the respective cosine functions "δ" along active fiber 12 and therefore the entire resonator. The above can be described:

$$\delta = \Delta\beta(T)L$$

where T is a temperature, L is a resonator length and $\Delta\beta$ is the difference between wave vectors of respective fundamental and HOM(s) propagating in one direction.

Assuming that the phase of the perturbation index in the forward directions is $\delta_f$. Since the phase of the perturbation index in the opposite, backward direction is fixed and at the output of the resonator is equal to 0, then when $$\phi = \delta_f = 2\pi N + \pi$$

the resultant coupling coefficient is maximally reduced because the cosine functions of the respective perturbation indices destructively interfere with one another. As a consequence, the signal forward and backward perturbation components may practically cancel out one another and, thus, a coupling coefficient may be eliminated. Hence, the fundamental mode may preserve a great percentage of its energy.

FIG. 3 graphically illustrates the distribution of light power within a resonator. It can be easily understood that as the difference between signal power Pf of forward propagating perturbation component 26 and Pbw of backward propagating perturbation component 28 approaches zero at the end of the active fiber, the resultant induced grating and therefore cross-coupling coefficient become progressively weaker.

The teaching of the disclosure can be also applied to an optical amplifier. It is worth remembering however that the resultant mode in a backward direction is rather weak compared to the resultant mode in the forward direction due to the absence of Bragg gratings.

FIG. 4 illustrates the fluctuation of the laser system's output with a narrow linewidth in response to a temperature change. Well defined high peaks and valleys are indicative of intense mode interference. However, within a small temperature interval ΔTdes between about 27.3 and 27.6° C. the output is visibly flattened while reaching the highest power. This is the temperature range within which the MM fiber laser system may emit radiation substantially in a fundamental mode.

FIG. 5 diagrammatically illustrates a gain block 30 including, among numerous components, a waveguide with two passive fibers 32 and 34 spliced to respective ends of active MM fiber 36. A thermoelectric element 38 based on Peltier effect is operative to maintain the predetermined desirable temperature range ΔTdes within which gain block 30 outputs high power radiation substantially in a fundamental mode.

The desired temperature range is stored in a memory of controller 40, which shown inside the gain block only for illustrative purposes, and in fact located outside the latter. During the testing of the block, a temperature range of thermoelectric element 38, within which the optical path changes so that the signal perturbation components are counter-phase shifted, is determined. Once set, the length of active fiber 12 and, therefore, the length of the optical path are maintained in the field. In practical terms, it may be realized by a feedback circuit associated with the controller so as to controllably keep the ambient temperature within the desired diapason. As a result, the length of active fiber 12 is maintained so as to provide the optimal length of optical path.

Alternatively, an optical path can be altered based on the piezoelectric effect. As known a piezoelectric substance is one that produces an electric field when a mechanical stress is applied. Conversely, a mechanical deformation, which in the context of the disclosure affects the length of MM fiber 36 and therefore the length of the optical path, is produced when an electric field is altered. Accordingly, the piezoelectric is means may be used instead of or in addition to thermoelectric element 38 and coupled to controller 40 operative to control electric field of the means in a known manner so as to provide the desired shift between the perturbation components.

While the above description mainly relates to an oscillator, the teaching of the disclosure can be also applied to an optical amplifier. In case of the amplifier, it is worth remembering however that the resultant signal perturbation component in the backward direction mode is rather weak compared to the forward signal component.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

The invention claimed is:

1. A method of minimizing a coupling between high order modes ("HOM") and a fundamental mode ("FM") in a single mode high power fiber laser system configured with multiple passive single-mode fibers which flank a multimode ("MM") active fiber and optically are coupled to respective opposite ends of the MM active fiber, wherein the FM and HOM travel in forward and backward directions along an optical path, which includes the MM active fiber, while interfering with one another so as to create respective forward and backward perturbation components, the method comprising controllably altering a length of the optical path so as to shift the forward and backward perturbation components in a counter-phase position, thereby minimizing a cross-coupling coefficient between the FM and HOM so as to have an output radiation in the FM.

2. The method of claim 1, wherein the altering of the length of the MM active fiber includes providing a thermoelectric element, and controlling an output of the thermoelectric element to maintain a desired range of temperatures affecting the length of the optical path.

3. The method of claim 1, wherein the altering the length of the optical path includes providing a piezoelectric element and controlling an output thereof so as to maintain a length of the MM active fiber within a desired range.

4. The method of claim 2 further comprising storing the desired temperature range in a memory of a controller of the laser system.

5. The method of claim 1, wherein the passive single-mode fibers have respective wavelength-selective elements defining the optical path therebetween.

6. The method of claim 2 further comprising coupling the thermoelectric element to a controller so as to maintain the desired temperature range.

7. The method of claim 3 further comprising coupling the piezoelectric element to a controller operative to maintain the output of the piezoelectric element within the desired range.

8. The method of claim 1, wherein the high power fiber laser system has a configuration of an optical amplifier.

9. A high power single mode fiber laser system comprising: a single mode ("SM") input passive fiber delivering light to an active multimode ("MM") fiber, the MM fiber being configured to guide the light in opposite forward and backward directions along an optical path so as to create forward and backward propagating perturbation components, wherein the forward and backward perturbation components are counter-phase shifted and cancel one another while propagating along the optical path.

10. The high power fiber laser system of claim 9 further comprising a SM output passive fiber spaced from the input passive fiber so as to flank the active MM fiber, the input and output SM passive fibers being provided with respective wavelength-selective elements defining a resonant cavity therebetween.

11. The high power fiber laser system of claim 9 further comprising a pump arrangement operative to emit and deliver pump light to the active MM active fiber.

12. The high power fiber laser system of claim 9 further comprising a thermoelectric element operative to create temperature in a temperature range within which the optical path has a desired length.

13. The high power fiber laser system of claim 9 further comprising a piezoelectric element coupled to the active MM fiber and operable so that the optical path has substantially a desired length.

14. The high-power fiber laser system of claim 9, wherein the counter phase position of the forward and backward perturbation components corresponds to $2\pi N+\pi$, where the N is an integer.

15. The high-power fiber laser system of claim 9 further comprising a controller operative to receive a signal selected from the group consisting of an ambient a temperature and electric field of a piezo-element and a combination thereof, and in response to generate a control signal maintaining the temperature or electric field or combination thereof at a desired level.

16. The high power fiber laser system of claim 9 further comprising a plurality of SM passive and MM active fibers coupled to one another in the resonant cavity.

* * * * *